(12) United States Patent
Gaertner et al.

(10) Patent No.: US 10,375,774 B2
(45) Date of Patent: Aug. 6, 2019

(54) INTEGRATED DEVICE AND METHOD FOR DRIVING LIGHTING LOADS WITH A BRIGHTNESS COMPENSATION

(71) Applicants: STMicroelectronics S.r.l, Agrate Brianza (IT); STMicroelectronics Application GMBH, Ascheim-Dornach (DE)

(72) Inventors: Manuel Gaertner, Feldkirchen (DE); Sergio Lecce, Pavia (IT); Giovanni Luca Torrisi, Catania (IT)

(73) Assignees: STMicroelectronics S.r.l., Agrate Brianza (MB) (IT); STMicroelectronics Application GMBH, Ascheim-Dornach (DE)

( * ) Notice: Subject to any disclaimer, the term of this patent is extended or adjusted under 35 U.S.C. 154(b) by 12 days.

(21) Appl. No.: 15/216,561

(22) Filed: Jul. 21, 2016

(65) Prior Publication Data

US 2017/0188419 A1  Jun. 29, 2017

(30) Foreign Application Priority Data

Dec. 23, 2015  (IT) .................. 102015000087426

(51) Int. Cl.
  *H05B 33/08*  (2006.01)
  *B60Q 1/14*  (2006.01)

(52) U.S. Cl.
  CPC ....... *H05B 33/0809* (2013.01); *B60Q 1/1407* (2013.01); *H05B 33/083* (2013.01); *H05B 33/0845* (2013.01); *H05B 33/0848* (2013.01)

(58) Field of Classification Search
  CPC ............ H05B 33/0815; H05B 33/0818; H05B 33/0851; H05B 33/086; H05B 33/0866; H05B 33/0872; H05B 33/0854; H05B 33/0827; H05B 33/0845; H05B 33/0848; H05B 37/02; H05B 37/0254; H05B 33/02; H05B 33/08; H05B 33/0803; H05B 33/0806; H05B 33/0809; H05B 33/0812; H05B 33/0821; H05B 33/0824; H05B 33/083
  See application file for complete search history.

(56) References Cited

U.S. PATENT DOCUMENTS

| 4,717,868 A | 1/1988 | Peterson |
| 8,093,833 B2 | 1/2012 | Joos et al. |
| 2003/0025465 A1 | 2/2003 | Swanson et al. |
| 2004/0207532 A1 | 10/2004 | Smithson |
| 2005/0030192 A1 | 2/2005 | Weaver et al. |

(Continued)

FOREIGN PATENT DOCUMENTS

DE  102009025346 A1  12/2010

*Primary Examiner* — Tung X Le
*Assistant Examiner* — Borna Alaeddini
(74) *Attorney, Agent, or Firm* — Slater Matsil, LLP

(57) ABSTRACT

An integrated device for driving a lighting load, such as a LED, has a first memory element, configured to store a nominal duty-cycle at a nominal supply voltage. An actual voltage acquisition element is configured to detect an actual supply voltage. A processing unit is coupled to the first memory element and to the actual voltage acquisition element and configured to calculate a voltage compensated duty-cycle. A driver unit is coupled to the processing unit and is configured to be supplied according to the voltage compensated duty-cycle.

24 Claims, 3 Drawing Sheets

(56) References Cited

U.S. PATENT DOCUMENTS

| | | | |
|---|---|---|---|
| 2006/0220570 A1* | 10/2006 | Evans | H05B 33/0803 |
| | | | 315/86 |
| 2007/0090766 A1 | 4/2007 | LaGrave et al. | |
| 2007/0182338 A1* | 8/2007 | Shteynberg | H05B 33/0815 |
| | | | 315/200 R |
| 2007/0182347 A1* | 8/2007 | Shteynberg | H05B 33/0815 |
| | | | 315/312 |
| 2008/0258637 A1 | 10/2008 | Leung | |
| 2009/0273290 A1 | 11/2009 | Ziegenfuss | |
| 2010/0308733 A1 | 12/2010 | Shao | |
| 2011/0309759 A1* | 12/2011 | Shteynberg | H05B 33/0815 |
| | | | 315/201 |
| 2013/0113388 A1 | 5/2013 | Reams | |
| 2014/0055045 A1* | 2/2014 | Raval | H02M 3/33507 |
| | | | 315/186 |
| 2014/0055051 A1* | 2/2014 | Raval | H05B 33/0818 |
| | | | 315/193 |
| 2014/0062319 A1* | 3/2014 | Huang | H05B 33/0815 |
| | | | 315/186 |
| 2014/0252965 A1* | 9/2014 | Pope | H02M 3/04 |
| | | | 315/185 R |
| 2015/0061528 A1* | 3/2015 | Raval | H05B 33/0827 |
| | | | 315/210 |
| 2016/0029455 A1* | 1/2016 | Aydin | H05B 33/0827 |
| | | | 315/193 |

\* cited by examiner

INTEGRATED DEVICE AND METHOD FOR DRIVING LIGHTING LOADS WITH A BRIGHTNESS COMPENSATION

This application claims priority to Italian Patent Application No. 102015000087426, filed on Dec. 23, 2015, which application is hereby incorporated herein by reference.

TECHNICAL FIELD

The present invention relates to an integrated device and method for driving lighting loads, for example LEDs, with a brightness compensation.

BACKGROUND

As is known, LEDs are more and more used in lightening devices (lamps) in increasing fields, due to their advantageous characteristics as to costs, dimensions, duration, directionality and electrical efficiency, so that the LED lamp market is projected to grow by more than ten-fold over the next decade.

LED based lamps are used both stand-alone and included in more complex systems. In the latter case, often a controller is configured to manage the operation of a number of different loads. For example, in the automotive field, control of the switching of the LEDs and their functionality is generally included in a system. The system includes a microcontroller and at least one drive device that are formed in different chips for controlling a number of functions, including, e.g., mirror adjustment, lock control, direction indicator, various lightening functions.

An example of such a system is shown in FIG. 1. Here a microcontroller 1 has a plurality of controller I/O pins 1A coupled, through a number of respective connection lines 2, e.g., a Serial Peripheral Interface bus, to a drive device 3. The drive device 3 has a first plurality of drive I/O pins 3A coupled with the connection lines 2, a second plurality of drive I/O pins 3B coupled with external loads 4 (including, e.g., motors for mirror adjustment, mirror folding, door locking, not shown in detail) and a third plurality of drive I/O pins 3C coupled with a plurality of LED groups 5, for example ten. Each LED group 5, in turn, generally includes a plurality of LED elements 7 series-connected to a respective resistor 6.

The drive device 3 generally includes an interface, logic and diagnostic unit 10 coupled to the first plurality of I/O pins 3A for communication/data exchange with the microcontroller 1. The interface, logic and diagnostic unit 10 is also coupled, through respective driver elements 8, to the second plurality of drive I/O pins 3B and, through respective power devices 11, e.g. high-side MOS transistors, to the third plurality of I/O pins 3C. A supply voltage $V_B$ is fed to the blocks of the drive device 3, including the interface, logic and diagnostic unit 10, the driver elements 7 and the power devices 11.

With the architecture of FIG. 1, the LED groups 5 are generally switched on and off by the interface, logic and diagnostic unit 10 according to a PWM modulation technique to control light brightness. In fact, from a physical point of view, LED brightness is correlated to the current flowing through them and, varying the average current flowing in the resistors 6 through a PWM modulation of the supply voltage applied thereto, it is possible to adjust the brightness according to the requirements.

To this end, generally, the power devices 11 are supplied according to a standard duty-cycle, in case adapted to the specific type and number of LED elements 7, as stored in the interface, logic and diagnostic unit 10.

In many applications, it is desired to maintain a constant light brightness when the LED elements are on. Brightness of current LEDs depends on a number of parameters, including actual supply voltage level. However, in particular in automotive applications, supply voltage is not generally constant. In fact, in the automotive field, numerous voltage transients may occur on the supply voltage $V_B$, both negative and positive caused, for example, by start of a vehicle engine, which may cause a drop of the supply voltage $V_B$ to a half of its nominal value (e.g., from 12 V to 6 V), and switching on/off of heavy inductive loads, such as window opening motors. Therefore, in case of varying supply voltage, brightness is not constant, and flickering may occur, which is undesired.

To avoid this nuisance, the microcontroller 1 may modify the standard duty-cycle of each of the LED groups 5 so as to maintain a constant brightness in case of varying supply voltage. In particular, in presence of supply voltage variations, the microcontroller 1 may calculate correction factors of the LED duty-cycle and send suitable control signals to the drive device 3.

With the above approach, a direct drive input from the microcontroller 1 to each LED group 5 would be necessary; therefore, both on the microcontroller 1 and on the drive device 3 a plurality of dedicated pins would be needed. This would entail an increase of the number of pins which is often not possible and, in any case, undesired.

Even when the existing lines 2 are capable to manage the brightness correction signals, e.g. by being implemented as an SPI bus, the frequent variations of the supply voltage would cause a high signal traffic on the lines 2, which is disadvantageous.

In addition, a high job load for the microcontroller 1 is generated, which may be problematic on account of the further control functions carried out by the microcontroller 1.

Moreover, since in standard systems the communication speed on the Serial Peripheral Interface bus implementing the lines 2 and relevant interfaces in the microcontroller 1 and in the drive device 3 is limited, frequent duty-cycle adjustment may be not always possible in real time, preventing maintaining the desired constant brightness.

Furthermore, since control signal are associated with electro-magnetic emissions, a high traffic due to frequent duty-cycle adjustment may generate a high EMC noise, which is undesired.

Another solution may reside in measuring and controlling the current flowing in the LED groups. However, this solution would involve a high power dissipation inside the power drive device.

SUMMARY

Embodiments of the invention provide a brightness compensation overcoming prior art disadvantages.

According to the present invention, there are provided an integrated device and method for driving LEDs with a brightness compensation.

BRIEF DESCRIPTION OF THE DRAWINGS

For the understanding of the present invention, preferred embodiments are now described, purely as a non-limitative example, with reference to the enclosed drawings, wherein.

Hereinbelow, implementations will be described of a brightness control device integrating driving functions of LEDs. The same solution may be however applied to other lighting loads, that may require a brightness adaptation based on the actual supply voltage.

DETAILED DESCRIPTION OF ILLUSTRATIVE EMBODIMENTS

An exemplary brightness control device here described adjusts the duty-cycle based on the actual supply voltage and the characteristics of the LEDs, including the number of LEDs in each LED group and therefore the forward voltage of the LED groups, according to the following law:

$$DC_C = \frac{V_{th} - V_{LED}}{V_B - V_{LED}} DC_n = kDC_n \quad (1)$$

wherein $DC_C$ is the compensated duty-cycle, $DC_n$ is the standard, nominal duty-cycle, set at a nominal supply voltage $V_{TH}$, $V_B$ is the actual supply voltage, subject to instant variation, and $V_{LED}$ is the forward voltage of a respective LED group (sum of the voltage drops on all the series-connected LED elements forming a LED group, as below described). Of course, when the supply voltage $V_B$ is at the nominal value $V_{TH}$ (no voltage affecting event, such as ignition, actuation of an electrical load and so on, occurs), the correction factor k is equal to 1 and the compensated duty-cycle $DC_C$ is equal to the standard duty-cycle $DC_n$.

Figure 2:
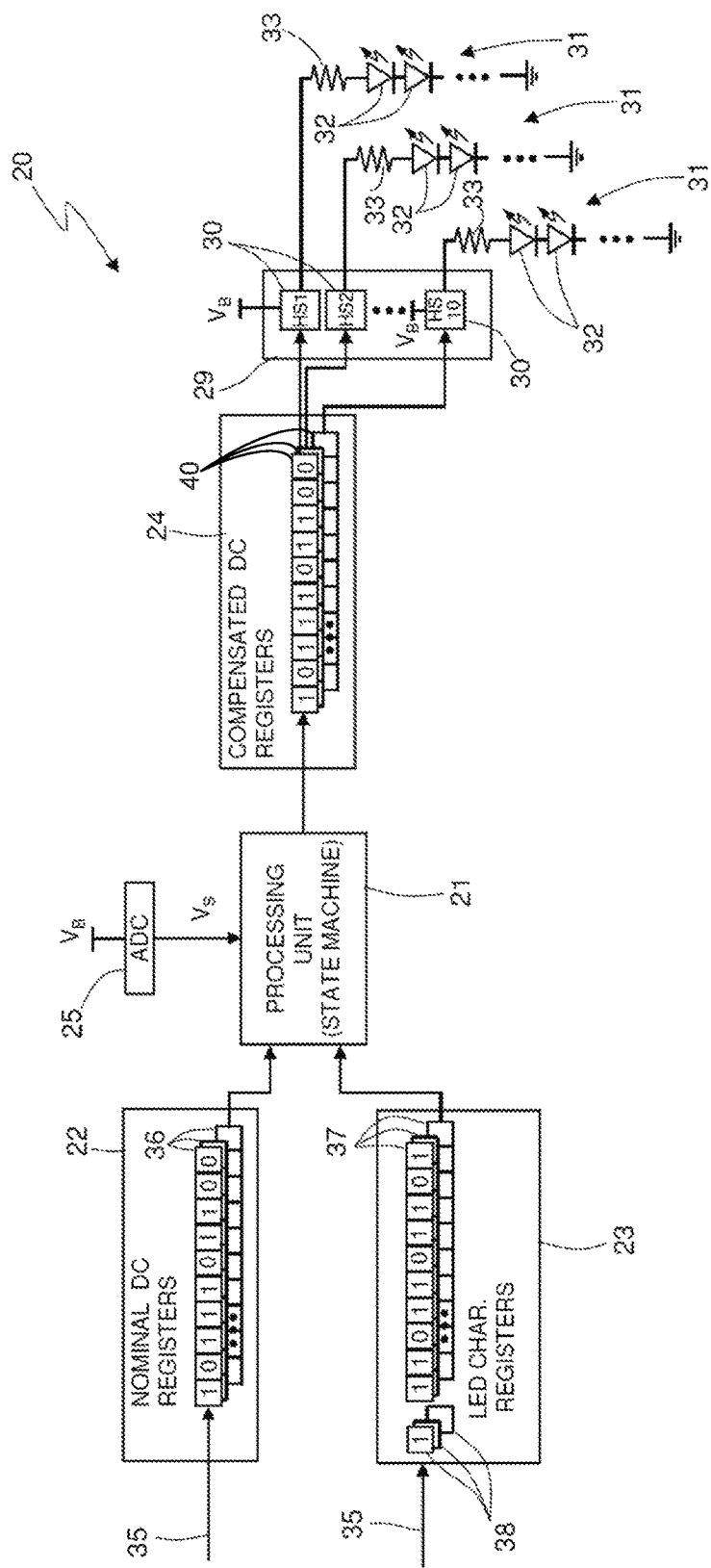
FIG. 2 is a schematic diagram of the present brightness control system.

FIG. 2 shows an embodiment of a brightness control device 20 operating based on the above principle.

Brightness control device 20 is coupled to a driver unit 29 including a plurality of LED drivers 30, each LED driver 30 in turn coupled to an own LED group 31. E.g., ten LED groups 31 may be provided, each group comprising a plurality of series-connected LED elements 32, e.g., ten, and a resistor 33.

Brightness control device 20 comprises a processing unit 21 for performing a brightness control algorithm, e.g. a state machine implemented as hardwired logic; a first register unit 22, for storing the nominal duty-cycle $DC_n$; a second register unit 23, for storing LED characteristics, including forward voltage $V_{LED}$; a third register unit 24, for storing compensated duty-cycle $DC_C$, and an ADC converter 25, the first, second and third register units 22-24 and the ADC converter 25 being coupled to the processing unit 21.

In the embodiment of FIG. 2, standard duty-cycle $DC_n$, LED forward voltage $V_{LED}$ and the compensated duty-cycle $DC_C$ are separately stored for each LED group 31, to allow maximum flexibility and the possibility of using different LED groups 31 which have a different standard duty-cycle $DC_n$ and/or a different LED forward voltage $V_{LED}$ and thus use a different compensated duty-cycle $DC_C$.

To this end, first register unit 22 comprises a plurality of nominal duty-cycle registers 36, each one associated to an own LED group 31, coupled to input lines 35. Input lines 35 may be, e.g., implemented by an SPI bus. Each nominal duty-cycle register 36 of the first register unit 22 may store the respective standard duty-cycle $DC_n$ with a ten bit accuracy; the standard duty-cycle $DC_n$ being set at a nominal supply voltage, e.g., at 10 V, and loaded from the outside through the input lines 35. At each adjustment cycle, as described in more detail below with reference to FIG. 4, the nominal duty-cycle registers 36 of the first register unit 22 supply the relevant standard duty-cycle values $DC_n$ to the processing unit 21.

Second register unit 23 comprises a plurality of LED characteristics registers 37, each one associated to an own LED group 31, and a plurality of adjustment activation memory elements 38, each one associated to an own LED group 31. The register 37 and memory elements 38 of the second register unit 23 are also coupled to the input lines 35 and to the processing unit 21. Each characteristics register 37 may store the respective LED forward voltage $V_{LED}$ with a ten bit accuracy, as received from the outside, e.g. set in an initial setting step of the apparatus including the brightness control device 20. Each adjustment activation memory element 38 may store a single activation bit for each LED group 31, each bit being indicative of whether brightness of the respective LED group 31 is to be compensated for supply voltage.

Third register unit 24 comprises a plurality of compensated duty-cycle registers 40, each one associated to an own LED group 31 and coupled to an own LED driver 30. Each compensated duty-cycle register 40 of the third register unit 24 may store the respective compensated duty-cycle $DC_C$ with a ten bit accuracy as computed by the processing unit 21 at each adjustment cycle, as described in more detail below with reference to FIG. 4.

Figure 4:
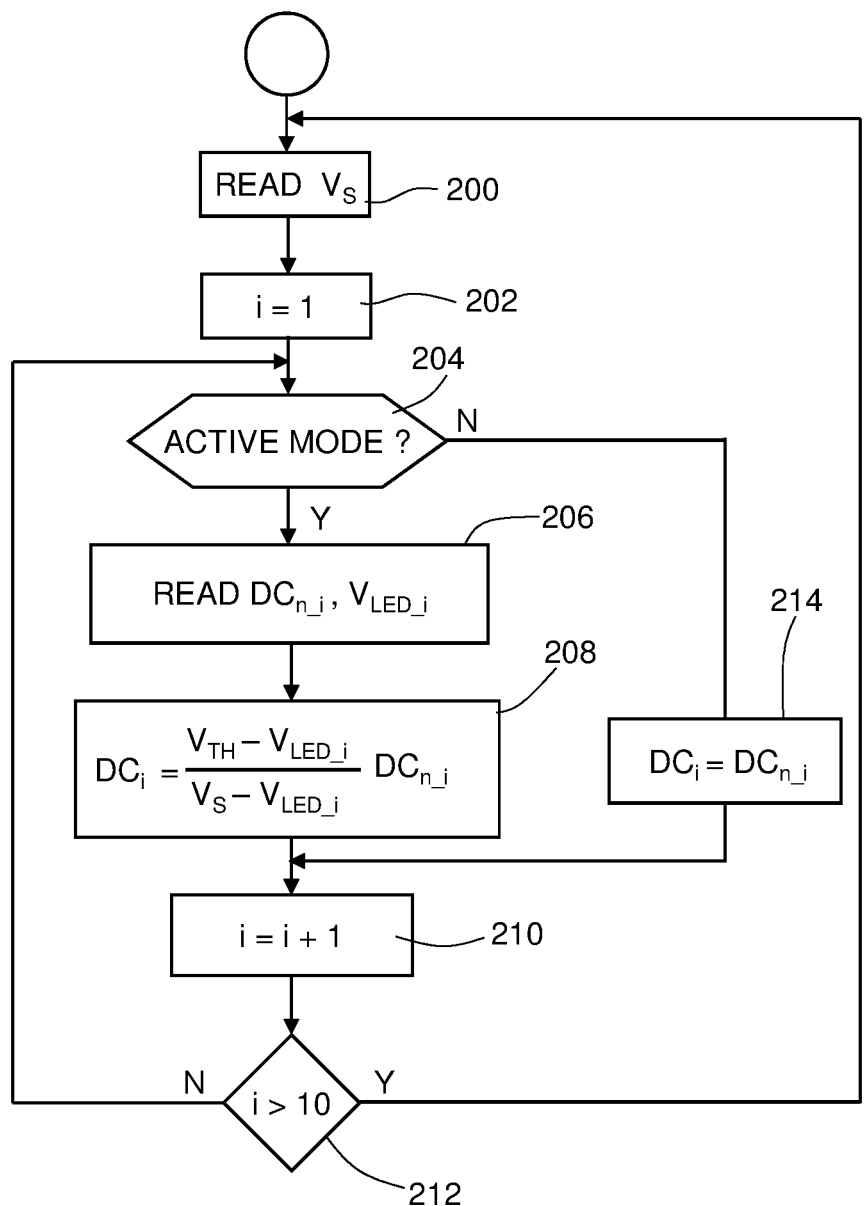
FIG. 4 is a flow-chart of the present brightness control method.

The ADC converter 25 is a voltage measuring element coupled to a supply voltage $V_B$ and generates a digital value $V_S$ fed to the processing unit 21 to allow calculation of the compensated duty-cycle $DC_C$ at each cycle, based on the actual supply voltage, as described in more detail below with reference to FIG. 4.

Figure 1:
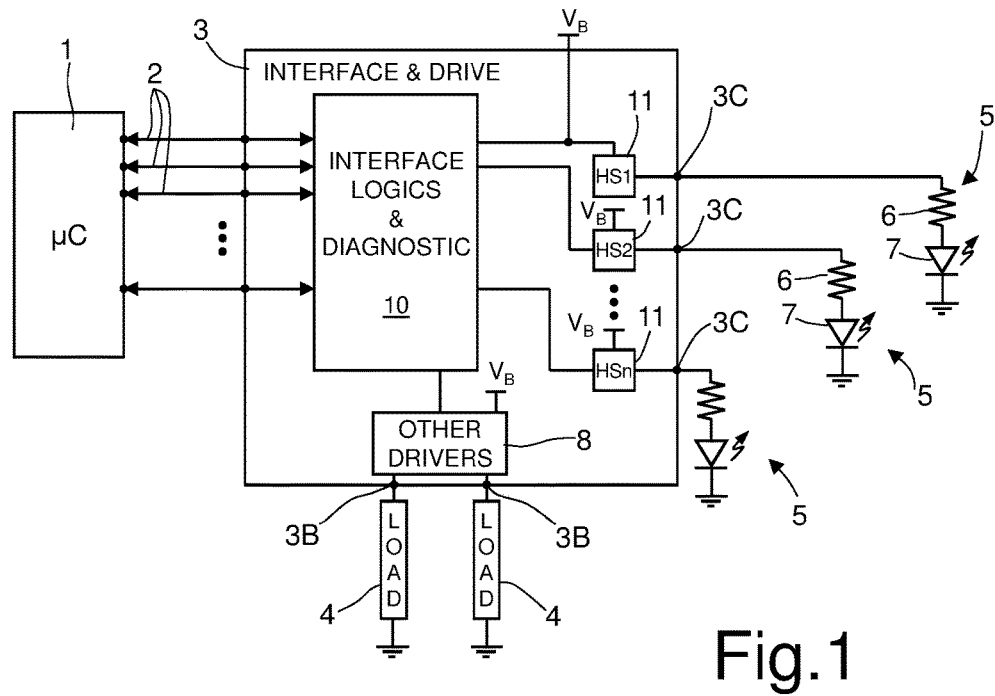
FIG. 1 shows a schematic diagram of a brightness control system usable, e.g., in automotive applications.
Figure 3:
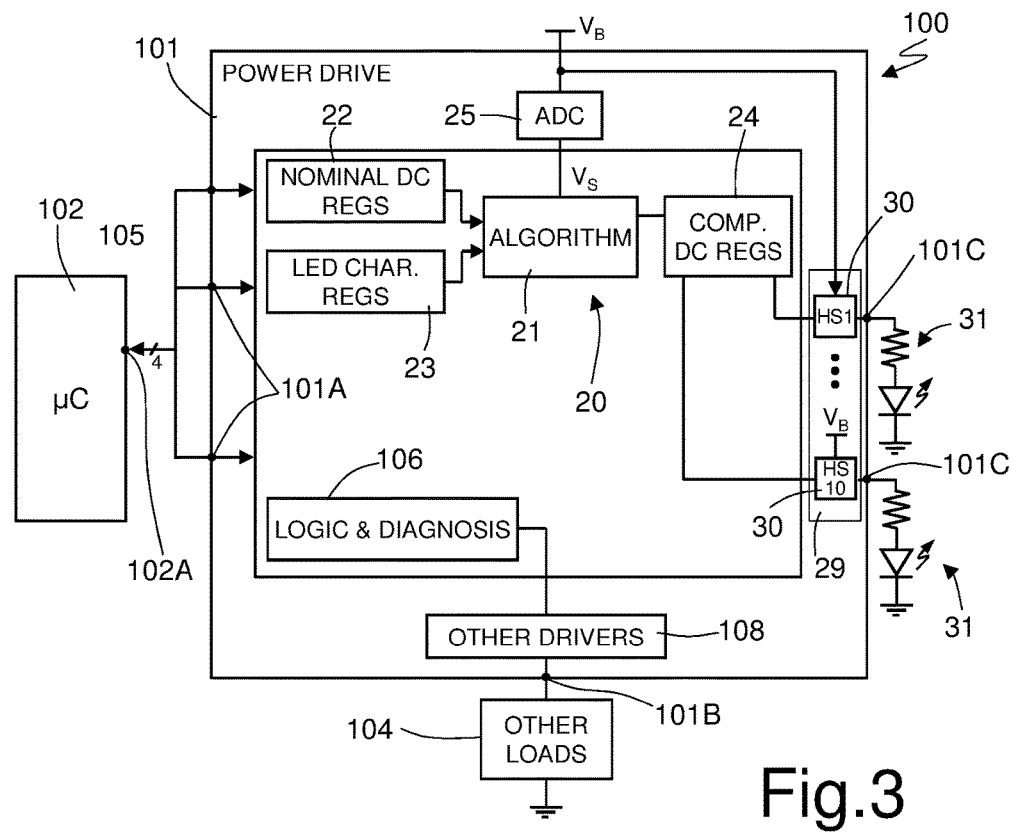
FIG. 3 is another schematic diagram of the present brightness control system.

FIG. 3 shows an embodiment of a brightness control device as part of an electrical load control system 100 intended, e.g., for automotive application. In FIG. 3, elements similar to the embodiment of FIG. 2 have been indicated using the same reference numbers.

The electrical load control system 100 comprises a power drive device 101, a microcontroller 102, LED groups 31 and other loads 104, such as mirror adjustment motors, lock control motors, direction indicator, other lightening elements.

The microcontroller 102 has a plurality of controller I/O pins 102A coupled, through a number of respective connection lines 105, e.g. implemented by a Serial Peripheral Interface bus, to power drive device 101.

Power drive device 101 may include the brightness control device 20 of FIG. 2; a logic and diagnostic unit 106; drive unit 29 (should be indicated in FIG. 3), and other drivers 108.

The power drive device 101 thus has a first plurality of drive I/O pins 101A coupled with the connection lines 105, the logic and diagnostic unit 106 and the brightness control device 20; a second plurality of drive I/O pins 101B coupled with the other loads 104, and a third plurality of drive I/O pins 101C coupled with the driver unit 29 and the plurality of LED groups 31.

Similar to FIG. 2, brightness control device 20 comprises the processing unit 21, e.g. a state machine implemented as hardwired logic; the first register unit 22, for storing the nominal duty-cycle $DC_n$; the second register unit 23, for storing LED forward voltage $V_{LED}$; the third register unit 24 for storing the compensated duty-cycle $DC_C$ and the ADC converter 25 for acquiring the digital value $V_S$ of the actual supply voltage. The processing unit 21, implementing the algorithm for brightness control, may be a same element as logic and diagnostic unit 106.

The logic and diagnostic unit 106 is coupled with the other drivers 108 to control operation of the other loads 104.

The brightness control device 20 is may operate as below described with reference to FIG. 4.

In a setting phase (not shown), the first register units 22 are loaded with the nominal duty-cycle $DC_{n\_i}$ for each of the LED groups 31 and the second register units 23 are loaded with the LED forward voltage $V_{LED\_i}$ for each of the LED groups 31. In addition, if provided, the second register units 23 may be loaded with the single activation bit, for each of the LED groups 31. The nominal supply voltage $V_{TH}$ is also stored in the brightness control device 20.

In operation, at each compensation cycle, initially the processing unit 21 reads the digital value $V_S$ of actual supply voltage at the output of ADC converter 25, step 200. Then, step 202, a LED group counter i is initialized to 1 and, step 204, the processing unit 21 checks whether adjusting is set for the specific i-th LED group 31, by reading the content of the relevant adjustment activation memory element 38.

If so (output Y from step 204), the nominal duty-cycle $DC_{n\_i}$ and LED forward voltage $V_{LED\_i}$ in the first and second registers 22, 23 for the respective LED group 31_i are read, step 206, and the present, compensated duty-cycle $DC_{C\_i}$ for the i-th LED group is calculated, using the above equation (1), and then stored in the respective third register unit 24, step 208.

If no adjusting is set for the specific LED group 31 (output N from step 204), the present duty-cycle $DC_{C\_i}$ is set to be the nominal duty-cycle $DC_{n\_i}$, step 214.

Then, in both cases, step 210, the LED group counter i is incremented and, step 212, it is verified whether the present duty-cycle $DC_{C\_i}$ has been determined for each LED group 31. If no, output N from step 212, the processing unit 21 returns to step 204 to check whether adjusting is set for the subsequent LED group 31; if yes, output Y from step 212, the processing unit 21 returns to step 200.

The values of the present (compensated) duty-cycle $DC_{C\_i}$ loaded in the third register unit 24 are then used for driving the LED groups 31.

The advantages of the present device and method are clear from the above. In particular, it is underlined that the present brightness control device and method achieves a real-time adjustment of the brightness, without receiving control signals from an external microprocessor and without involving relevant signal traffic on the first plurality of drive I/O pins 101A. Thus, the job load for an external microprocessor is minimized; the traffic, in particular timing, on the connection lines (e.g. SPI bus) 31, 105 is minimized; no current sensing elements are needed.

The solution is very flexible as the algorithm is located in the brightness control device 20 and the parameter (nominal duty-cycle, forward voltage of the LEDs) are programmable. Therefore, any type of LEDs may be used, independently from their characteristics, number of series-connected elements, and so on. The above applies also to any future generations thereof, whose characteristic are not yet known. In addition, the brightness control device 20 may operate at supply voltages that are different from the nominal one $V_{TH}$.

The nominal duty-cycle, e.g., its time-variation including any increasing or decreasing ramps, may be programmed through the connections lines (e.g. SPI bus) 31, 105, thus allowing very high flexibility in brightness.

A high number of LED groups may be compensated in real time without direct drive inputs.

The present brightness control device has a low power dissipation, much lower than the solution based on the measure of the current in the loads.

Finally, it is clear that numerous variations and modifications may be made to device and method described and illustrated herein, all falling within the scope of the invention as defined in the attached claims.

For example, in case the nominal duty-cycle is same for all LED groups, a single register may be provided in the first register unit 22. Analogously, activation/deactivation of the LED groups may be set for all LED groups, thus using a single adjustment activation memory element 38 for all LED groups.

What is claimed is:

1. An integrated device for driving a lighting load, the integrated device comprising:
   a first memory element configured to store a nominal duty-cycle at a nominal supply voltage;
   an actual voltage acquisition element configured to detect an actual supply voltage;
   a processing unit coupled to the first memory element and to the actual voltage acquisition element, the processing unit configured to calculate a voltage compensated duty-cycle;
   a driver unit coupled to the processing unit and configured to be supplied according to the voltage compensated duty-cycle;
   a second memory element coupled to the processing unit and configured to store the voltage compensated duty-cycle; and
   a third memory element coupled to the processing unit, the third memory element configured to store a load characteristic value;
   wherein the processing unit is configured to calculate a voltage compensated duty-cycle $DC_C$ according to equation:

$$DC_C = \frac{V_{th} - V_{LED}}{V_B - V_{LED}} DC_n$$

wherein $DC_N$ is the nominal duty-cycle, $V_{TH}$ is the nominal supply voltage, $V_{LED}$ is the load characteristic value, and $V_B$ is the actual supply voltage.

2. The integrated device according to claim 1, wherein the load characteristic value comprises a load voltage drop.

3. The integrated device according to claim 1, further comprising a plurality of load terminals coupled to the driver unit and configured to be coupled to a plurality of lighting loads, the driver unit comprising a plurality of driver elements, each driver element being coupled to a respective load terminal.

4. The integrated device according to claim 3, wherein the first memory element comprises a plurality of nominal duty-cycle registers, each nominal duty-cycle register being associated to a respective drive element and a respective load terminal.

5. The integrated device according to claim 3, further comprising a plurality of characteristics registers, each characteristics register being associated to a respective drive element and a respective load terminal.

6. The integrated device according to claim 3, further comprising an adjustment activation memory configured to store an activation bit indicative of whether brightness of the lighting load is to be compensated for supply voltage.

7. The integrated device according to claim 6, wherein the adjustment activation memory comprises a plurality of adjustment activation memory elements, each adjustment activation memory element being associated to a respective driver and a respective load terminal.

8. The integrated device according to claim 1, wherein the integrated device further comprises a plurality of load terminals coupled to the driver unit and configured to be coupled to a plurality of lighting loads, the driver unit comprising a plurality of driver elements, each driver element being coupled to a respective load terminal;
wherein the first memory element comprises a plurality of nominal duty-cycle registers, each nominal duty-cycle register being associated to a respective drive element and a respective load terminal;
wherein the integrated device further comprises a plurality of characteristics registers, each characteristics register being associated to a respective drive element and a respective load terminal;
wherein the integrated device further comprises an adjustment activation memory configured to store an activation bit indicative of whether brightness of the lighting load is to be compensated for supply voltage; and
wherein the adjustment activation memory comprises a plurality of adjustment activation memory elements, each adjustment activation memory element being associated to a respective driver and a respective load terminal.

9. The integrated device according to claim 1, wherein the first memory element and the third memory element are configured to be coupled to a microcontroller through an SPI bus.

10. The integrated device according to claim 1, wherein the actual voltage acquisition element comprises an AD converter configured to be coupled to a power supply.

11. The integrated device according to claim 1, wherein the processing unit comprises a state machine implemented as hardwired logic.

12. An integrated device for driving a lighting load, the integrated device comprising:
a supply voltage node;
an analog-to-digital converter with an analog input coupled to the supply voltage node;
a nominal duty cycle register that stores a nominal duty-cycle at a nominal supply voltage;
a hardwired logic circuit coupled to a digital output of the analog-to-digital converter and to the nominal duty cycle register, the hardwired logic circuit configured to implement a state machine to calculate a voltage compensated duty-cycle;
a characteristic register coupled to the hardwired logic circuit and configured to store a load voltage drop;
a compensated duty-cycle register coupled to the hardwired logic circuit to store the voltage compensated duty-cycle;
a driver element coupled to the supply voltage node and the compensated duty-cycle register; and
a load terminal configured to be connected to a lighting load;
wherein the integrated device is configured to calculate the voltage compensated duty-cycle $DC_C$ according to equation:

$$DC_C = \frac{V_{th} - V_{LED}}{V_B - V_{LED}} DC_n$$

wherein $DC_N$ is the nominal duty-cycle, $V_{TH}$ is the nominal supply voltage, $V_{LED}$ is a load characteristic value, and $V_B$ is an actual supply voltage.

13. The integrated device according to claim 12, wherein the integrated device comprises a plurality of load terminals and a plurality of driver elements, each driver element configured to be coupled to an associated lighting load via a respective load terminal.

14. The integrated device according to claim 13, wherein the integrated device comprises a plurality of nominal duty-cycle registers, each nominal duty-cycle register being associated with a respective drive element and a respective load terminal.

15. The integrated device according to claim 13, wherein the integrated device comprises a plurality of characteristics registers, each characteristics register being associated with a respective drive element and a respective load terminal and being configured to store a load voltage drop for the respective drive element.

16. The integrated device according to claim 13, further comprising a plurality of adjustment activation registers, each adjustment activation register being associated to a respective driver and a respective load terminal and configured to store an activation bit indicative of whether brightness of an associated lighting load is to be compensated for supply voltage.

17. An LED driver comprising:
a first output terminal configured to be coupled to a first LED;
a first driver circuit coupled to the first output terminal; and
a brightness control device configured to:
receive a nominal duty-cycle at a nominal supply voltage,
receive an actual supply voltage,
calculate a voltage compensated duty-cycle based on the nominal duty-cycle and the actual supply voltage, and
control switching of a voltage of the first output terminal with pulse width modulation based on the voltage compensated duty-cycle, wherein calculating the voltage compensated duty-cycle comprises calculating the voltage compensated duty-cycle according to equation:

$$DC_C = \frac{V_{th} - V_{LED}}{V_B - V_{LED}} DC_n,$$

wherein $DC_n$ is the nominal duty-cycle, $V_{TH}$ is the nominal supply voltage, $V_{LED}$ is a load characteristic value, and $V_B$ is the actual supply voltage.

18. The LED driver according to claim 17, further comprising an analog-to-digital converter coupled to the brightness control device, the analog-to-digital converter configured to provide the actual supply voltage, wherein the brightness control device comprises a compensated duty-cycle register configured to store the voltage compensated duty-cycle.

19. The LED driver according to claim 18, wherein the brightness control device further comprises a second register configured to store the load characteristic value.

20. The LED driver according to claim 19, wherein the brightness control device further comprises a state machine coupled to the compensated duty-cycle register, the second register, and the analog-to-digital converter, the state machine being implemented as hardwired logic.

21. The LED driver according to claim 19, wherein the second register comprises an adjustment activation memory bit indicative of whether brightness of the first LED is to be compensated for supply voltage.

22. The LED driver according to claim 17, further comprising the first LED.

23. The LED driver according to claim 22, wherein the first LED comprises a plurality of LEDs coupled in series.

24. The LED driver according to claim 17, wherein the load characteristic value comprises a load voltage drop.

* * * * *